US008312086B2

(12) United States Patent
Velusamy et al.

(10) Patent No.: US 8,312,086 B2
(45) Date of Patent: Nov. 13, 2012

(54) METHOD AND APPARATUS FOR MESSAGE CUSTOMIZATION

(75) Inventors: Umashankar Velusamy, Tampa, FL (US); George Louis Hughes, Jr., Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 425 days.

(21) Appl. No.: 11/771,546

(22) Filed: Jun. 29, 2007

(65) Prior Publication Data
US 2009/0006565 A1   Jan. 1, 2009

(51) Int. Cl.
G06F 15/16   (2006.01)
(52) U.S. Cl. .............................. 709/206; 704/8; 709/224
(58) Field of Classification Search .................. 709/206
See application file for complete search history.

(56) References Cited

U.S. PATENT DOCUMENTS

| | | | | |
|---|---|---|---|---|
| 6,141,695 | A * | 10/2000 | Sekiguchi et al. | 709/246 |
| 6,816,884 | B1 * | 11/2004 | Summers | 709/206 |
| 7,085,812 | B1 * | 8/2006 | Sherwood | 709/206 |
| 7,209,951 | B2 * | 4/2007 | Goldberg | 709/206 |
| 7,529,804 | B1 * | 5/2009 | Lu et al. | 709/206 |
| 7,548,846 | B1 * | 6/2009 | Monster | 704/8 |
| 2002/0078158 | A1 * | 6/2002 | Brown et al. | 709/206 |
| 2002/0169839 | A1 * | 11/2002 | Goldberg | 709/206 |
| 2002/0178228 | A1 * | 11/2002 | Goldberg | 709/206 |
| 2002/0194341 | A1 * | 12/2002 | Gupta | 709/227 |
| 2003/0131063 | A1 * | 7/2003 | Breck | 709/206 |
| 2003/0172119 | A1 * | 9/2003 | Hosali et al. | 709/206 |
| 2003/0225837 | A1 * | 12/2003 | Delia et al. | 709/206 |
| 2004/0201625 | A1 * | 10/2004 | Karamchedu et al. | 345/752 |
| 2005/0027781 | A1 * | 2/2005 | Curry et al. | 709/200 |
| 2006/0053198 | A1 * | 3/2006 | Pricken et al. | 709/206 |
| 2006/0075035 | A1 * | 4/2006 | Tripp | 709/206 |
| 2006/0168064 | A1 * | 7/2006 | Huynh et al. | 709/206 |
| 2007/0041370 | A1 * | 2/2007 | Cleveland | 370/352 |
| 2007/0044011 | A1 * | 2/2007 | Cottrille et al. | 715/511 |
| 2007/0260694 | A1 * | 11/2007 | Boss et al. | 709/207 |
| 2008/0222254 | A1 * | 9/2008 | Mukherjee | 709/206 |
| 2008/0281922 | A1 * | 11/2008 | Renshaw et al. | 709/206 |

* cited by examiner

Primary Examiner — Firmin Backer
Assistant Examiner — Hamza Algibhah

(57) ABSTRACT

Disclosed is an apparatus for customizing messages. The apparatus includes a communications unit and a processing unit. The communications unit can be configured to receive a message from a sender and intended for one or more target recipients. The communications unit can also be configured to receive one or more message customization indicators that are from either or both of the sender and respective ones of the target recipients. The message customization indicators are respectively related to identifying characteristics of the respective target recipients and the sender when provided by the sender and respective ones of the target recipients. The processing unit can be configured to cause respective output versions of the message to be outputted to the target recipients, each respective output version being output in a format consistent with the message customization indicators and at least one of the respective output versions being different from another of the respective output versions. Also disclosed are corresponding methods and computer program products.

18 Claims, 2 Drawing Sheets

METHOD AND APPARATUS FOR MESSAGE CUSTOMIZATION

BACKGROUND INFORMATION

Electronic mail ("email") messages are exchanged every day by billions of people in both personal and professional capacities. In some cases, an email message is composed with the ultimate intention of sending the message to more than one person, either by sending the message multiple times or through the use of distribution lists. However, such multiple or mass distribution of a message usually means that either all of the ultimate recipients of the message will receive an identical version of the message or that significant effort must be expended to personalize the message for individual recipients amongst the total intended recipient group.

BRIEF DESCRIPTION OF THE SEVERAL VIEWS OF THE DRAWING(S)

DETAILED DESCRIPTION

Exemplary embodiments now will be described more fully hereinafter with reference to the accompanying drawings. Like numbers refer to like elements throughout.

Figure 1:
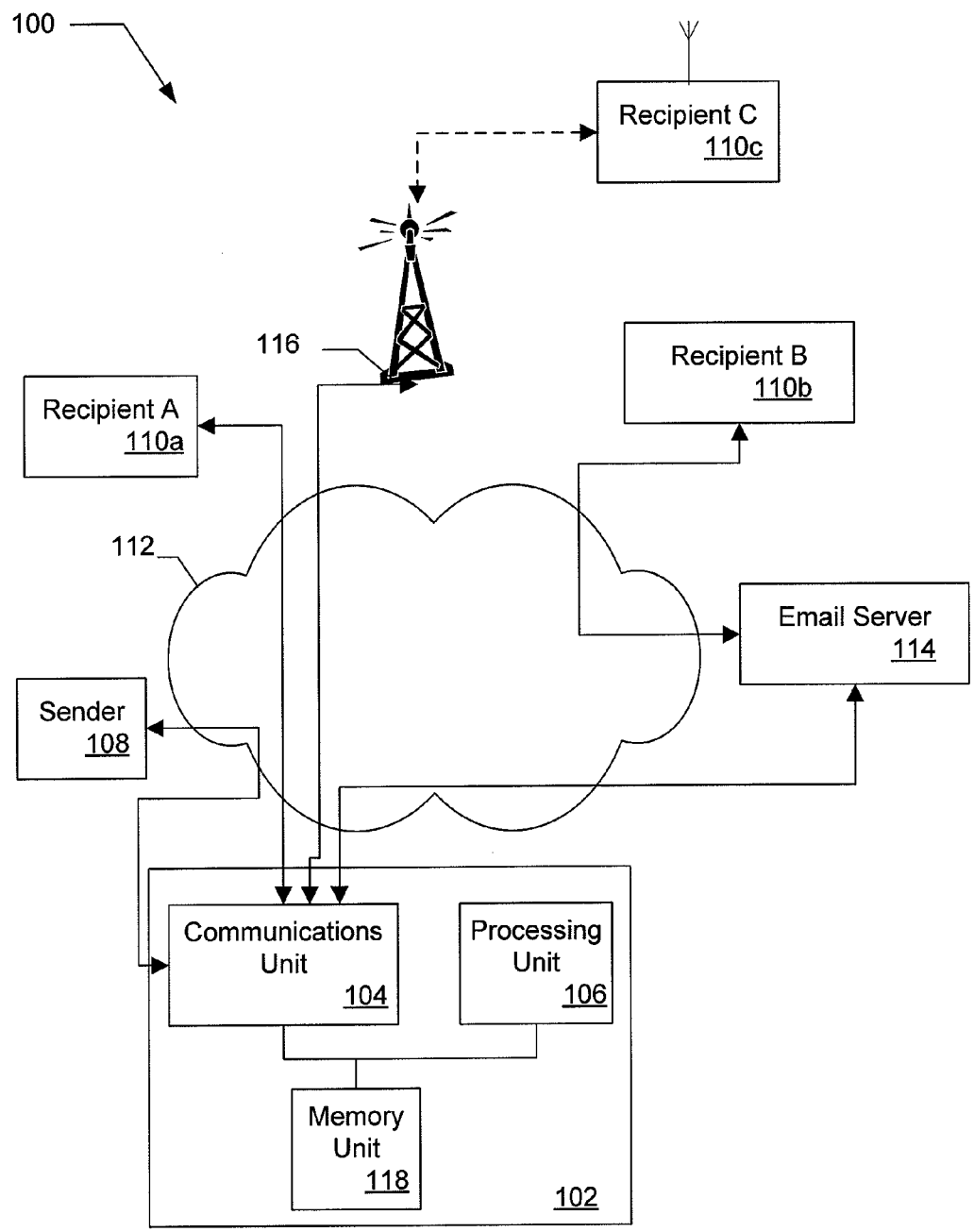
FIG. 1 is a block diagram representing a communications system configured in accordance with an exemplary embodiment.

Referring to FIG. 1, therein is shown a block diagram representing a communications system 100 configured in accordance with an exemplary embodiment. The communications system 100 includes a server 102 having a communications unit 104 and a processing unit 106. The server may be, for example, an electronic mail ("email") server that receives electronic mail ("email") messages from at least one sender 108. The communications unit 104 may be configured to receive a message that is collectively intended for one or more target recipients 110a, 110b, 110c (i.e., persons, devices, etc.). The communications unit 104 may be any component or set of components that allow for communications, and may include, for example, a physical network connection, such as an Ethernet connection; a wireless network connection; and/or a wireless transceiver. The server 102 may facilitate communications between a sender 108 and target recipients 110a-c via a network, such as the Internet 112, and may work together with separate email servers 114 and/or a wireless network, such as a cellular network that includes a plurality of base stations with respective cellular antennas 116, in providing communications between the sender 108 and the recipients 110a-c. It is noted that the terms "sender" and "recipients" are contextual, in that an entity acting as a sender at one point may be a recipient at another time, and vice versa.

The communications unit 104 may also be configured to receive one or more message customization indicators. The message customization indicators provide indication of the manner or manners in which the original message might be modified before being received by target recipients (the message modification process is discussed below). The message customization indicators can be used to affect the content of the message for intended recipients either by reformatting the message or by modifying the content of the message, based on properties associated with recipients (as discussed further below).

For message customization indicators provided by the sender of a message, the message customization indicators may be related to identifying characteristics of the respective target recipients of a message. For message customization indicators provided by a target recipient of the message, the message customization indicators may be related to identifying characteristics of the sender of a message. For example, message customization indicators can be related to the individual identity of a sender or a respective target recipient of the associated message, to a group membership of a target recipient (e.g., a noted political affiliation, a place of employment), to the Internet Protocol address associated with a respective target recipients, and/or to electronic mail address information associated with the respective recipients (e.g., a country designation like ".jp", a domain designation like ".edu", or an organization or service provider indication like "@yahoo"). As such, the message customization indicators can be customized for specific target recipients or for messages being received from a specific sender. The communications unit 104 may be configured to receive the message customization indicators so as to respectively associate each target recipient and/or sender with one or more recipient-specific or sender-specific message customization indicators.

The processing unit 106 may be any processing device, such as, for example, a microprocessor, an integrated circuit, and/or any other computing device. The processing unit 106 may be configured to cause respective output versions of the message to be outputted to associated target recipients, possibly via the separate email server 114 and/or a wireless network, such as a cellular network that includes a plurality of base stations with respective cellular antenna 116. Each respective output version of the message may be in a format that is consistent with a corresponding one or more of the message customization indicators. For example, a message customization indicator may indicate that a portion of the message text should be hidden, that some of the message text should be highlighted, that the font (appearance, color, size, bolding, italicizing, etc.) of some or all of the message text should be modified, that the language of the text should be changed, that a salutation should be added to the message, that message text should be rearranged, abbreviated, and/or condensed (e.g., taking specified text and arranging it to form a summary), and/or that attachments should be added to/removed from the message, and the processing unit 106 would consider the message customization indicators and cause output versions to be generated that reflect the characteristics specified thereby. Overall, at least one output version of the message may be different from another of the output versions of the same message, and one, multiple, or all of the output versions may be dissimilar from the original message.

The server 102 may also include a memory unit 118 in communication with the communications unit 104 and the processing unit 106. The memory unit 118 may include any suitable memory device, such as, for example, a read only memory (ROM) and/or a random access memory (RAM). The memory unit 118 may store the message customization indicators received via the communications unit 104. The memory unit 118 may additionally store computer-readable instructions, the computer-readable instructions being executable by the server 102, such as by the processing unit 106, to perform the functions described herein.

The communications unit 104 may be configured to receive the message customization indicators from any number of sources including, for example, the sender 108 of the message, from one or more of the target recipients 110a-c, or both. For example, the sender 108 may specify via a message customization indicator that only selected recipients from amongst all target recipients of a message are to see a portion of the message, that portion being hidden for all others. At the same time, one of the target recipients 110a-c may specify, via another message customization indicator, a preference to see messages only in a certain language when being received from a certain sender. Also, the message customization indicators may be received together with receiving or delivering a message to which the message customization indicators pertain, and/or the message customization indicators may be received by the communications unit 104 separately from the message. That is, for example, the sender 108 may specify message customization indicators for a given recipient or class of recipients independently of creating a message, those message customization indicators being, for example, stored in the memory unit 118 for use with subsequent messages for which the overall distribution list includes the given recipient.

In some cases, the processing unit 106 may be configured to generate respective versions of the original message, while in others the processing unit may facilitate the generation of the output versions by another component. The communications unit 104 may be configured to respectively communicate with the target recipients so as to receive respective message requests, such as, in the case of email messages, when one attempts to download messages stored remotely. The processing unit 106 may be configured to cause corresponding output versions of a message to be generated only subsequent to the receipt by the communications unit 104 of the respective message request from the target recipient for which the output version of the message is required.

Figure 2:
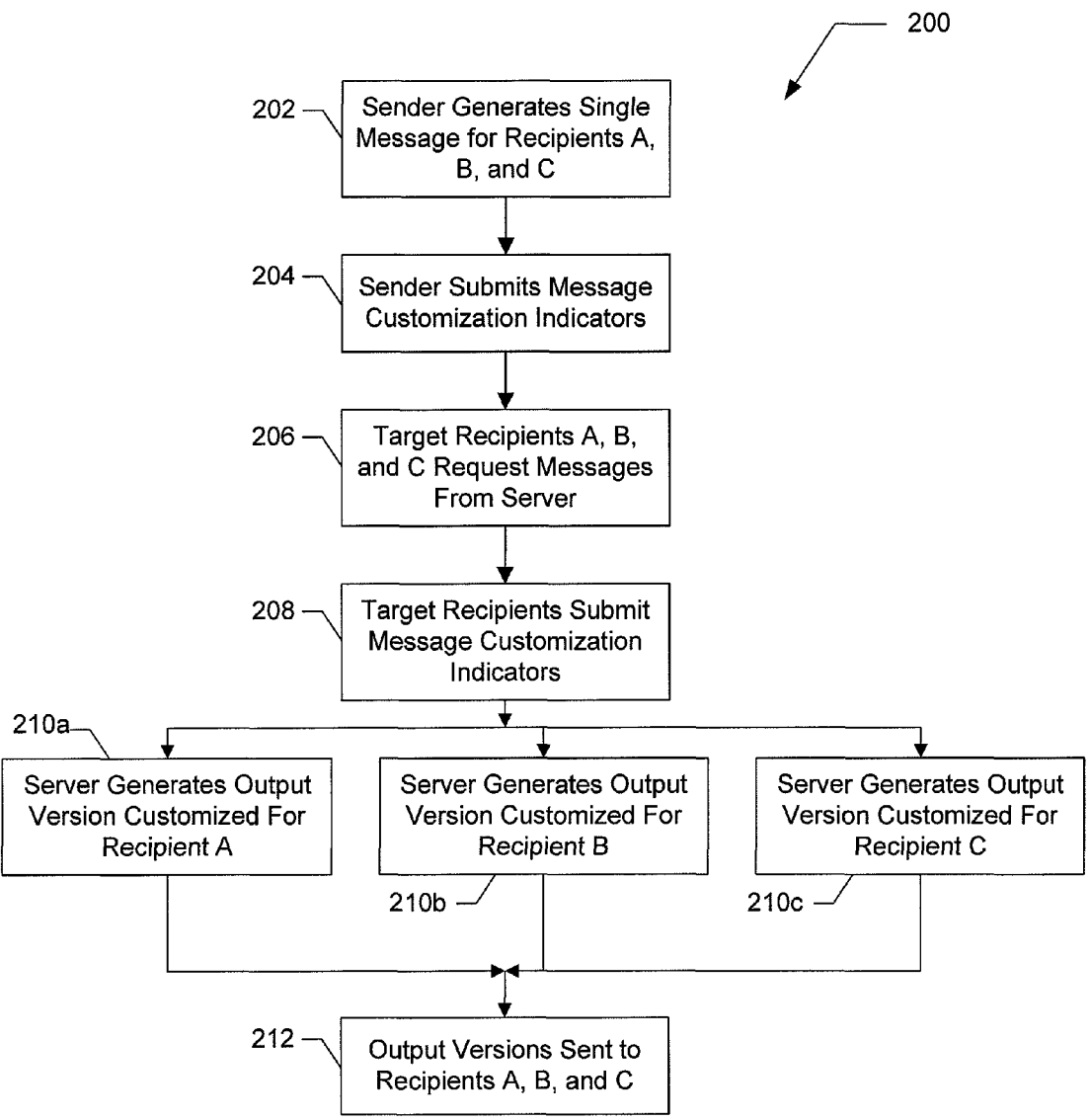
FIG. 2 is a flow chart representing an exemplary method of using the communications system of FIG. 1.

Referring to FIGS. 1 and 2, an example of a method 200 of use of the above described communications system 100 is now provided. In this example, the sender 108 desires to send a single email message simultaneously to a group of respective target recipients including Recipient A 110a, Recipient B 110b, and Recipient C 110c. However, the sender 108 prefers that each recipient 110a-c receive an output version of the message that is individually addressed in the body of the message to the corresponding recipient. Further, the sender 108 would like Recipient A to receive only the first paragraph of the entire message (e.g., consider the case where the first paragraph provides an executive summary of the entire contents of the message). Also, the message includes portions that are of specific interest to those in the educational community, a group of persons that includes Recipient B. In addition, the sender 108 wishes that all messages sent to employees of Company X (of which Recipient C is one) include a standard disclaimer. Finally, Recipient C has a preference that messages received from the sender 108 be in Chinese.

The sender 108 may generate, at Block 202 a single message containing the total, i.e., a superset, of the content for transmission to each of the respective target recipients. Additionally, at Block 204, the sender 108 may submit to the server 102, along with the message, a series of message customization indicators as follows: a first message customization indicator specifying that identification information for each target recipient should be obtained and utilized in placing an individualized address in the body of each message; a second message customization indicator specifying that all text beyond the first paragraph of the message should be hidden before the message is delivered, the second message customization indicator being associated with Recipient A; and a third message customization indicator specifying that a certain portion of the message text should be highlighted for messages being delivered to those target recipients having an email address ending in ".edu". Separately from creating and/or sending the message, the sender 108 may send to the server 102 a fourth message customization indicator specifying that a standard disclaimer statement should be added to all messages being delivered to email addresses containing "@company_x". All of these message customization indicators may be received by the communications unit 104, and the message customization indicators are stored in the memory unit 118 along with the message, which is awaiting delivery.

Subsequently, at Block 206, each of the respective target recipients 110a-c may establish communications with the server 102 to request any messages intended therefor. At the time when Recipient A 10a sends a message request to the server 102, the processing unit 106 generates, at Block 210a, an output version of the message for which all but the first paragraph is hidden from view. Further, the processing unit 106 causes the phrase "Dear Recipient A" to be inserted at the beginning of the output version intended for Recipient A 110a. The information necessary to insert the personalized address may be obtained, for example, from an address book located in the server 102, or may be obtained automatically from Recipient A 110a, at Block 208, when the message request is received from Recipient A by the server. At Block 212, the customized output version of the message is sent to Recipient A.

When Recipient B 110b sends, at Block 206, a message request to the server 102, the processing unit 106 notes that Recipient B has an email address ending in ".edu" and generates, at Block 210b, an output version of the message in which some text is highlighted. (Of course, if the distribution list for the message included others with email addresses ending in ".edu", their respective output versions would be similarly modified.) The output version sent to Recipient B 110b at Block 212 also includes the greeting "Dear Recipient B." Finally, when Recipient C 110c sends a message request to the server 102 at Block 206, the processing unit 106 notes that Recipient C has an email address including "@company_x" and inserts, at Block 210c, the requested disclaimer (as well as the greeting "Dear Recipient C"). Also, along with the message request, the server 102 receives from Recipient C 110c, at Block 208, a message customization indicator specifying that the message to be delivered to Recipient C should be translated into Chinese, which operation the processing unit 106 undertakes or facilitates at Block 210c before sending the message at Block 212.

Overall, embodiments of the above described communications system 100 may allow a sender of a message intended for group distribution to create a single message that may be customized for individual recipients subsequent to message creation. Further, embodiments of the above described communications system 100 may allow a recipient of a message intended for group distribution to receive a message that is customized subsequent to message creation based on the specific sender or source. The factors affecting the customization may be specified by the sender, a recipient, or even another entity (e.g., an employer of the sender), and may be specified at the time of message creation or in advance thereof.

One or more of the operations described above may be performed through hardware, software, or combinations thereof. As an example, embodiments may include a computer program product stored on a computer-readable storage medium (i.e., software stored in a memory unit), the computer program product comprising one or more executable portions or computer-readable instructions for performing the operations described herein.

The processing unit of the server may be embodied in many ways. For example, the processing unit may be embodied as a processor, a controller, and/or various other processing means or devices including integrated circuits such as, for example, an application specific integrated circuit ("ASIC"). The memory unit described herein may be various memory structures including volatile and non-volatile memory structures. The memory unit may be configured to store information, data, applications, instructions, or the like for enabling the devices disclosed herein to carry out various functions in accordance with exemplary embodiments, such as by storing software that is executable by the respective processing unit to cause the various functions of the processing unit that are described herein to be performed.

In the preceding specification, various embodiments of the claimed invention have been described. It will, however, be evident that various modifications and changes may be made thereunto without departing from the broader spirit and scope of the invention as set forth in the claims that follow. For example, while the above embodiments have been described in terms of email communications, it should be understood that other modes of communication, such as short message service (SMS) communications, multimedia message service (MMS) communications, video messaging, voice communications, etc., are also amenable to being utilized in conjunction with the concepts disclosed herein. For example, a video message may be sent (or an email message with a video attachment) along with a message customization indicator specifying that certain portions of the video (e.g., the last 20 seconds) may only be viewed by specified recipients. Additionally, while the above embodiments have been described in a client-server architecture, the above embodiments are merely exemplary and can be deployed in other computing architectures. Therefore, the specification and drawings are accordingly to be regarded in an illustrative rather than restrictive sense.

That which is claimed:

1. An apparatus comprising:
   a communications unit to:
      receive a message and one or more message customization indicators, the message being received from a sender and intended for one or more target recipients, and the one or more message customization indicators being received from the sender and at least one target recipient of the one or more target recipients, a first one of the one or more message customization indicators, received from the sender, identifying characteristics of the one or more target recipients, and a second one of the one or more message customization indicators, received from the at least one target recipient, identifying characteristics of the sender, and
      receive a message request from respective ones of the one or more target recipients; and
   a processing unit to:
      generate, based on the one or more message customization indicators and based on the communications unit receiving the message request from the respective ones of the one or more target recipients, respective output versions of the message,
         when generating the respective output versions of the message, the processing unit is to:
            change language of text included in the message for the at least one target recipient, and
            form a summary of a portion of text included in the message for at least another target recipient of the one or more target recipients, and
      cause the communications unit to send the respective output versions of the message to the respective ones of the one or more target recipients, each of the respective output versions of the message including a displayable text portion comprising a visual appearance associated with a respective message customization indicator of the one or more message customization indicators, and the displayable text portion of at least one of the respective output versions of the message comprising a visual appearance that is different from a visual appearance of the displayable text portion of another one of the respective output versions of the message.

2. The apparatus according to claim 1, further comprising:
   a memory unit in communication with the communications unit and the processing unit,
   where the communications unit is to receive the one or more message customization indicators separately from the message, and
   where the memory unit is to store the one or more message customization indicators.

3. The apparatus according to claim 1, where, when generating the respective output versions of the message, the processing unit is configured further to one or more of:
   hide a portion of text included in the message, highlight a portion of text included in the message, modify text font of text included in the message, or add a salutation to the message,
   where, when forming the summary, the processing unit is to:
      rearrange the portion of text included in the message to form the summary,
      abbreviate the portion of text included in the message to form the summary, or
      condense the portion of text included in the message to form the summary.

4. The apparatus according to claim 1, where the communications unit is to receive the one or more message customization indicators with the message.

5. The apparatus according to claim 1, where the characteristics of the at least one target recipient include one or more of:
   information identifying an identity of the at least one target recipient, information identifying a group associated with the at least one target recipient, Internet Protocol address information associated with the at least one target recipient, or electronic mail address information associated with the at least one target recipient; and
   where the characteristics of the sender include one or more of:
   an identity of the sender, information identifying a group associated with the sender, Internet Protocol address information associated with the sender, or electronic mail address information associated with the sender.

6. The apparatus according to claim 1, where the communications unit is to associate each of the one or more target recipients with a respective one of the one or more message customization indicators.

7. A method comprising:
   receiving a message and one or more message customization indicators, the message being received from a sender device and intended for one or more target devices, and the one or more message customization indicators being received from the sender device and at least one target device of the one or more target devices, a first one of the one or more message customization indicators, received from the sender device, identifying characteristics of the one or more target devices, and a second one of the one or more message customization indicators, received from the at least one target device, identifying characteristics of the sender device;

receiving a message request from respective ones of the one or more target devices;

generating, based on the one or more message customization indicators and based on receiving the message request from the respective ones of the one or more target devices, respective output versions of the message for the respective ones of the one or more target devices, generating the respective output versions of the message including at least one of:

changing language of text included in the message for at least another target device of the one or more target devices, or forming a summary of a portion of text included in the message for the at least one target device; and sending, to the respective ones of the one or more target devices, the respective output versions of the message, a displayable text portion, each of the respective output versions of the message, being in a format specified by a respective message customization indicator of the one or more message customization indicators, and the displayable text portion, of at least one of the respective output versions of the message, being in a format that differs from a format of the displayable text portion of at least another one of the respective output versions of the message.

8. The method according to claim 7, where receiving the message and the one or more message customization indicators comprises:

receiving the one or more message customization indicators separately from the message.

9. The method according to claim 7, where generating the respective output versions of the message further includes:

hiding a portion of the text included in the message, highlighting a portion of the text included in the message, modifying text font of the text included in the message, adding a salutation to the message, or adding attachments to the message, and where forming the summary includes at least one of:
condensing the portion of the text included in the message to form the summary,
rearranging the portion of text included in the message to form the summary, or
abbreviating the portion of text included in the message to form the summary.

10. The method according to claim 7, where receiving the message and the one or more message customization indicators includes receiving the message with the one or more message customization indicators.

11. The method according to claim 7, where the characteristics of the at least one target device include one or more of:

information identifying a user of the at least one target device, information identifying a group associated with the user of the at least one target device, Internet Protocol address information associated with the at least one target device, or electronic mail address information associated with the user of the at least one target device; and where the characteristics of the sender device include one or more of:

information identifying a user of the sender device, information identifying a group associated with the user of the sender device, Internet Protocol address information associated with the sender device, or electronic mail address information associated with the user of the sender device.

12. The method according to claim 7, where receiving the one or more message customization indicators includes:

associating each of the one or more target devices with a respective one of the one or more message customization indicators.

13. A memory device comprising:

a plurality of instructions which, when executed by a processor, cause the processor to:

receive a message and one or more message customization indicators, the message being received from a sender and intended for one or more target recipients, and the one or more message customization indicators being received from the sender and a target recipient of the one or more target recipients, a first one of the one or more message customization indicators, received from the sender, identifying characteristics of the one or more target recipients, and a second one of the one or more message customization indicators, received from the target recipient, identifying characteristics of the sender;

receive a message request from respective ones of the one or more target recipients;

generate, based on the one or more message customization indicators and based on receiving the message request from the respective ones of the one or more target devices, respective output versions of the message for the respective ones of the one or more target devices, one or more instructions, of the plurality of instructions, to generate the respective output versions of the message including:

one or more instructions to change language of text included in the message for at least another target device of the one or more target devices, and one or more instructions to form a summary of a portion of text included in the message for the at least one target device; and send, to the respective ones of the one or more target recipients, the respective output versions of the message, each of the respective output versions of the message including a displayable text portion comprising a visual appearance in a format specified by a respective message customization indicator of the one or more message customization indicators, and the displayable text portion of at least one of the respective output versions of the message comprising a visual appearance that is different from a visual appearance of the displayable text portion of another one of the respective output versions of the message.

14. The memory device of claim 13, further comprising one or more instructions to:

receive the one or more message customization indicators separately from the message.

15. The memory device of claim 13, where the one or more instructions to generate the respective output versions of the message further include one or more instructions to one or more of:

hide a text portion of text included in the message, highlight a text portion of text included in the message, modify text font of text included in the message, or add a salutation to the message, where the one or more instructions to form the summary include:

one or more instructions to rearrange the portion of text included in the message to form the summary, one or more instructions to abbreviate the portion of text included in the message to form the summary, or one or more instructions to condense the portion of text included in the message to form the summary.

16. The memory device of claim 13, further comprising one or instructions to:

receive the one or more message customization indicators with the message.

17. The memory device of claim 13, where the characteristics of the target recipient include one or more of:

information identifying the target recipient, information identifying a group associated with the target recipient, Internet Protocol address information associated with the target recipient, or electronic mail address information associated with the target recipient, where the characteristics of the sender include one or more of:

information identifying the sender, information identifying a group associated with the sender, Internet Protocol address information associated with the sender, or electronic mail address information associated with the sender.

18. The memory device of claim 13, further comprising one or more instructions to associate each of the one or more target recipients with a respective one of the one or more message customization indicators.

* * * * *